3,564,753
FISHING POLE HOLDER
Glen E. Fravel, 8005 N. Van Houten Ave.,
Portland, Oreg. 97208
Filed Dec. 15, 1969, Ser. No. 884,831
Int. Cl. A01k 97/10
U.S. Cl. 43—21.2                1 Claim

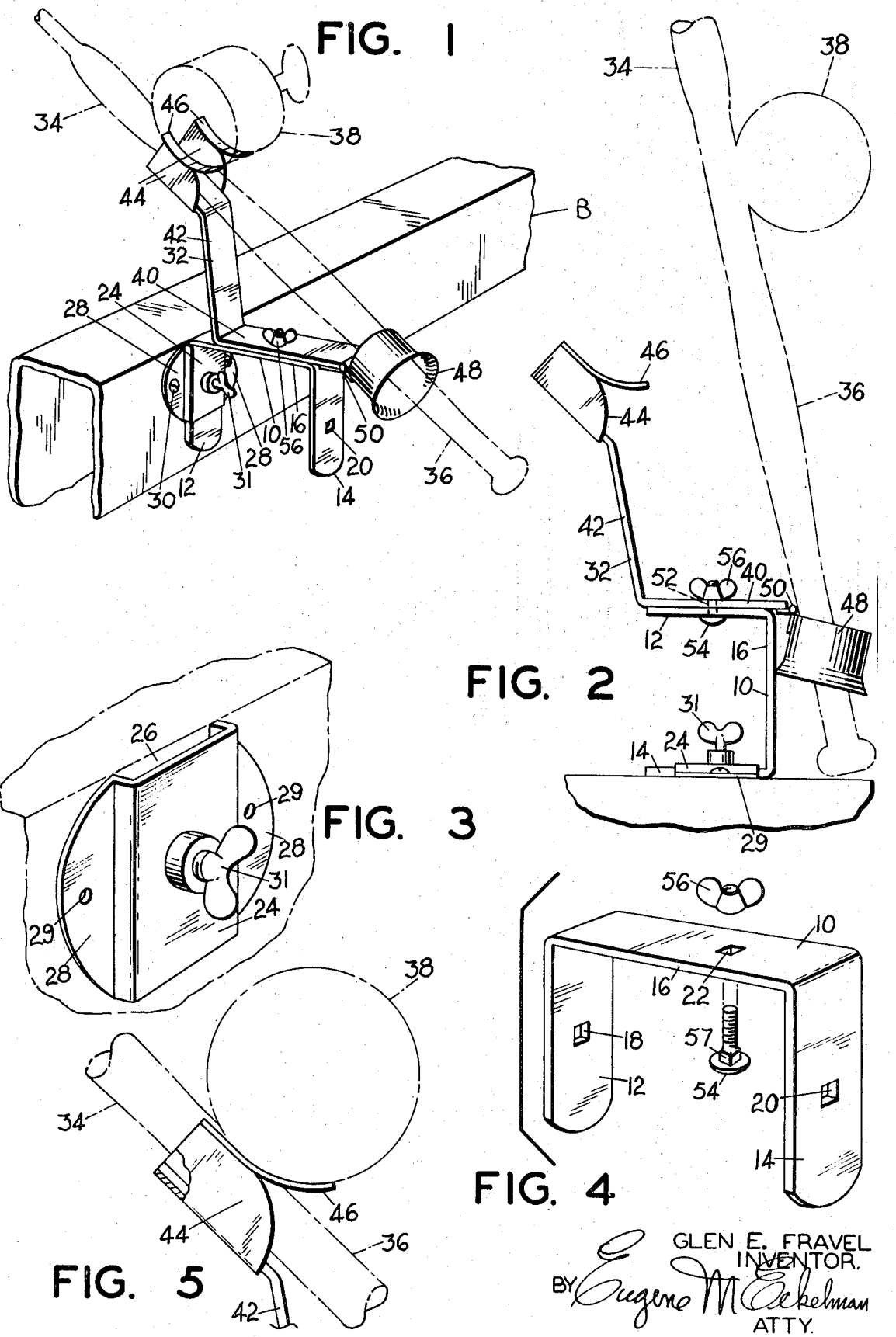

ABSTRACT OF THE DISCLOSURE

A fishing pole holder having a U-shaped base for adjustably holding a body member with a cradle at its forward end for supporting a portion of a fishing pole therein and a socket at the other end for telescopically receiving the butt end of the pole. The cradle is arranged to be engaged by a fishing reel on the pole in the manner to prevent rotation of the pole in the holder, and the socket is hingedly connected to the body member on a lateral axis so that the butt end of the pole can be rapidly and easily removed axially from such socket member. A bracket is attachable to the boat for receiving one or the other of the legs of the U-shaped base depending upon the mounting position desired for the pole-supporting body member.

BACKGROUND OF THE INVENTION

This invention relates to new and useful improvements in fishing pole holders.

Fishing pole holders have heretofore been provided for removably supporting a pole on a boat. These holders are intended to support a pole in a fishing position to obviate the necessity of the fisherman constantly holding the pole. When a fish strikes, it is necessary that the pole be removable rapidly and easily from the holder to prevent the fish from getting slack line. It is also desirable that the pole when supported in the holder remain in a stable position, particularly from rolling in the holder to prevent the reel from getting caught in the holder. It is further desirable that the holder have adjustment so that it can be projected straight out or obliquely from the boat as desired. Prior devices have not fullfilled the desired qualities above mentioned.

SUMMARY OF THE INVENTION

Accordingly, this invention resides in structure having as its primary objective to provide an efficient pole holder with novel structure facilitaing stabilized support of the pole in the holder well as allowing fast and easy removal of the pole from said holder.

More particular objects of the invention are to provide in a holder of the type described a novel body member having a cradle portion at its forward end providing stabilized engageable support for a reel on the pole; to provide a socket on the rearward end of the body member which is arranged to receive the butt end of the pole and which has a lateral axis hinged connection with the body member to allow the butt end of the pole to be moved axially therein; and to provide novel bracket means which facilitate convenient attachment of the holder to a boat and also capable of providing adjustable support for positioning the body member of the holder on either the inside wall of the boat or on the gunwale.

Another object of the invention is to provide a fishing pole holder of the type described which is simplified in construction and inexpensive to manufacture.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is a perspective view showing the present holder mounted on a boat for supporting a fishing pole, the holder being mounted on an inside wall of a boat;

FIG. 2 is a side elevational view of the holder, the holder in this view being shown supported on the top of the gunwale;

FIG. 3 is an enlarged perspective view of an attaching bracket used with the present holder;

FIG. 4 is an enlarged perspective view of a base member for supporting a pole holder and which is engageable with the attaching bracket; and FIG. 5 is an enlarged fragmentary side elevational view of the holder showing a forward reel-engaging cradle.

DETAILED DESCRIPTION OF THE PREFERRED EMBODIMENT

Referring in particular to the drawings, the fishing pole holder of this invention includes a U-shaped base 10 having a pair of legs 12 and 14 and a connecting wall 16. Legs 12 and 14 have apertures 18 and 20, respectively, intermediate their upper and lower ends and wall 16 has an aperture 22.

For connecting the base 10 to a boat B, there is employed a socket-type mounting bracket 24, seen in detail in FIG. 3, which may be mounted on an inside surface of the boat as shown in FIG. 1 or on the upper surface of the gunwale as shown in FIG. 2. The association of the base member 10 with the bracket 24 will be described in greater detail hereinafter. Bracket 24 is channel-shaped to form a socket or recessed portion 26 with the boat and has a pair of side flanges 28 with one or more apertures 29 for receiving fasteners 30, FIG. 1, for securing the mounting bracket to the boat. The bracket 24 has a setscrew 31 threadedly mounted therein for securing the base member 10 in place as will be more apparent hereinafter.

The holder includes a body member 32 for supporting a pole 34 which has a handle portion 36 and a reel 38 secured forward of the butt end of the handle. Body member 32 has a horizontal segment 40 which is arranged to be seated on and connected to one of the legs or connecting wall of the base 10 in a manner to be set forth hereinafter. Body member 32 also has an upwardly-angled segment 42 supporting integrally at its front end an upwardly-opening channel member 44. The upper edges of the side walls of the channel member 44 are turned outwardly at 46 and have a concaved configuration forming a cradle surface for the reel 38.

The rearward end of the horizontal segment 40 of the body member 32 carries a socket member or loop 48, and as one feature of the invention, such socket member has a hinged connection 50 to the rearward end of the body member. The axis of the hinge 50 extends laterally whereby to allow socket member 48 to pivot up and down which as will be seen hereinafter permits the fishing pole to be removed rapidly and easily from the holder.

The horizontal segment 40 of the body member 32 has an aperture 52, FIG. 2, for receiving a bolt 54 having a wing nut 56 thereon which provides easy attachment and removal of the body member 32.

In the use of the present fishing pole holder, the bracket 24 is attached to the boat in the desired place by the fasteners 30. As an example, such bracket may be attached to an inner wall of the boat as shown in FIG. 1 in which case the base 10 is supported in the bracket by fitting one of the legs 12 or 14 in the socket portion 26 of bracket 24. Thereupon, the set screw 31 is tightened to firmly hold the base member 10 in the mounting bracket 24. With the bracket 24 mounted on an inside wall of a boat, the body member 32 of the pole holder must be supported on the top of the connecting wall 16 of the base member 10, the conecting bolt 54 being associated with the aperture 22 in the bracket for this connection. Body member 32 may be rotated to any position on the bracket 10 to place it at the desired lateral angle relative to the boat and will be held at such angled position upon tightening of wing nut 56.

If the bracket 24 is secured to the upper surface of the gunwale of the boat as shown in FIG. 2, then one of the legs 12 or 14 must be fitted in the bracket and the body member 32 of the holder supported on the upper surface of the other leg, the bolt 54 in this position of the parts being associated with the aperture 18 or 20 depending upon which leg is inserted in the mounting bracket. The bolt 54 is a carriage bolt, having a neck portion 57 and the apertures 18, 20 and 22 are also rectangular and dimensioned to non-rotatably receive such neck portion. Thus, the wing nut 56 can be secured tightly without the bolt turning.

To mount a pole in the holder, the butt end of the pole handls is inserted in the socket member 48. The socket member 48 normally opens upwardly, and the handle is thus readily moved telescopically thereinto. Then the fishing pole is laid down on the body member such that the reel 38 lays in the concaved tabs 46 of the cradle, FIGS. 1 and 5, the pole being on the underside of the reel. The pole thus extends through the channel member 44 and the reel lays on the tabs 46. This provides a stable, non-rotating support of the pole in the holder. Since the pole cannot rotate, the reel will not become entangled in any portion of the holder, and furthermore, the reel is supported in an identical position on the pole as that in which it is operated when landing a fish.

To remove the pole from the holder it is merely necessary to raise the tip of the pole to an upright position such that the pole will readily slip out of the socket member. Thus, the pole does not have to be moved straight out from the holder over the side of the boat but rather is merely raised at the tip end toward the natural fish-playing position and then lifted upwardly to clear the socket member 48. Such movement not only allows the pole to be removed fast and easy but the fish line can be maintained taut during this time. FIG. 1 shows in phantom lines the pole in fishing position and FIG. 2 shows the pole raised at the tip for inserting and removing it.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

1. A fishing pole holder for use with a fishing pole having a handle and a reel and reel holding means disposed forwardly of a butt end of the pole, comprising:
  (a) a bracket,
  (b) support means comprising a U-shaped base having a pair of legs and a connecting wall,
  (c) said bracket being arranged to be secured to a boat and having means defining a recess for removably receiving a leg of said support means,
  (d) said bracket when mounted on a horizontal portion of a boat being arranged to receive a leg of said support means in a manner to support the other leg of the base in a horizontal position and when mounted on a vertical portion of a boat being arranged to receive a leg of said support means in a manner to support the connecting wall of said base in a horizontal position,
  (e) a body member having forward and rearward ends,
  (f) cradle means on the forward end of said body member opening upwardly for removably supporting the reel of a fishing pole in a non-rotatable position whereby the pole is maintained in a normal fishing and handling position;
  (g) means at the rearward end of said body member defining a loop arranged to telescopically receive an end portion of a fishing pole handle whereby in a supported position of a fishing pole in the holder the reel is supported in said cradle means and the butt end of the pole projects through said loop,
  (h) said loop being hingedly connected to the body member on a lateral axis whereby the fishing pole is insertable into and removable from a supported position on said body member by hinged movement of said socket means,
  (i) and clamp means arranged to clamp said body member on one of said legs and connecting wall depending upon the position of said bracket,
  (j) said clamp member being arranged to hold said body member in selected angularly directed positions thereon.

References Cited
UNITED STATES PATENTS

| | | | |
|---|---|---|---|
| 2,099,254 | 11/1937 | Ballman | 248—42 |
| 2,426,881 | 9/1947 | Johnson et al. | 248—42 |
| 2,548,328 | 4/1951 | Thayer | 248—42 |
| 2,606,731 | 8/1952 | Harris | 43—21.2 |
| 2,973,930 | 3/1961 | Smith | 248—40 |
| 3,154,274 | 10/1964 | Hillcourt | 248—42 |
| 3,319,911 | 5/1967 | Fuller | 248—42 |

SAMUEL KOREN, Primary Examiner

D. J. LEACH, Assistant Examiner

U.S. Cl. X.R.

248—42